United States Patent
Riad et al.

(10) Patent No.: US 9,661,280 B2
(45) Date of Patent: May 23, 2017

(54) REARVIEW OBSTRUCTION CAMERA SYSTEM AND ASSOCIATED METHOD

(71) Applicant: Honda Motor Co., Ltd., Minato-ku, Tokyo (JP)

(72) Inventors: Yousuf Riad, Dublin, OH (US); Stephen Mullaly, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 253 days.

(21) Appl. No.: 14/522,276

(22) Filed: Oct. 23, 2014

(65) Prior Publication Data

US 2016/0119586 A1    Apr. 28, 2016

(51) Int. Cl.
 H04N 7/18    (2006.01)
 B60R 1/00    (2006.01)
 B60R 1/08    (2006.01)

(52) U.S. Cl.
 CPC .............. *H04N 7/183* (2013.01); *B60R 1/00* (2013.01); *B60R 2300/802* (2013.01); *B60R 2300/8026* (2013.01); *B60R 2300/8066* (2013.01)

(58) Field of Classification Search
 None
 See application file for complete search history.

(56) References Cited

U.S. PATENT DOCUMENTS

| | | | |
|---|---|---|---|
| 7,008,090 B2 * | 3/2006 | Blank | B60Q 1/2665 362/276 |
| 7,230,523 B2 | 6/2007 | Harter, Jr. et al. | |
| 7,292,208 B1 | 11/2007 | Park et al. | |
| 7,564,479 B2 | 7/2009 | Schedivy | |
| 2003/0025793 A1 * | 2/2003 | McMahon | H04N 7/181 348/148 |
| 2006/0232672 A1 | 10/2006 | Sim et al. | |
| 2009/0284598 A1 | 11/2009 | Busch et al. | |
| 2010/0073480 A1 | 3/2010 | Hoek et al. | |
| 2010/0328463 A1 | 12/2010 | Haler | |
| 2012/0050074 A1 * | 3/2012 | Bechtel | B60R 1/04 340/988 |
| 2012/0212614 A1 | 8/2012 | Oszwald et al. | |
| 2012/0330504 A1 * | 12/2012 | Nelson | B60R 1/12 701/36 |
| 2013/0038730 A1 | 2/2013 | Peterson et al. | |

(Continued)

FOREIGN PATENT DOCUMENTS

| | | |
|---|---|---|
| EP | 2 150 437 B1 | 6/2014 |
| EP | 2 465 730 B1 | 9/2014 |

(Continued)

*Primary Examiner* — William C Vaughn, Jr.
*Assistant Examiner* — Stuart Bennett
(74) *Attorney, Agent, or Firm* — Arent Fox LLP

(57) ABSTRACT

A rearview obstruction camera system provides rearward view if visibility to a driver as a result of cargo impacts a view directly out the rear windshield. Likewise, an occupant(s) sitting in the rear seats can obstruct the view of the driver out the rear the vehicle. In both instances the rearward view is potentially compromised. By using a sensor(s), the rearview obstruction camera system can detect if the line of sight of the driver out the rear of the vehicle is obstructed. If obstructed, the rearview camera captures a live feed of traffic behind a vehicle and the image is displayed in front of the driver (e.g. on the rearview mirror, navigation display, or the like).

15 Claims, 4 Drawing Sheets

(56) References Cited

U.S. PATENT DOCUMENTS

| | | | |
|---|---|---|---|
| 2013/0038732 A1 | 2/2013 | Waite et al. | |
| 2013/0229519 A1* | 9/2013 | Kavuru | B60R 11/04 348/148 |
| 2014/0036072 A1* | 2/2014 | Lyall | G06K 9/00771 348/143 |
| 2014/0176713 A1* | 6/2014 | Ho | B60R 1/00 348/148 |

FOREIGN PATENT DOCUMENTS

| | | | | |
|---|---|---|---|---|
| JP | 2004-330873 A | 11/2004 | | |
| JP | 2009-078597 A | 4/2009 | | |
| JP | 2010-095202 A | 4/2010 | | |
| WO | WO 98/15427 A1 | 4/1998 | | |
| WO | WO 2014/130049 A1 | 8/2014 | | |
| WO | WO 2014130049 A1 * | 8/2014 | | B60R 1/00 |

* cited by examiner

REARVIEW OBSTRUCTION CAMERA SYSTEM AND ASSOCIATED METHOD

BACKGROUND

The present disclosure relates to a system for monitoring a potential obstruction, and an associated method of assisting a vehicle driver with monitoring a rearward view. More particularly, the disclosure is directed to a rearview camera arrangement that uses a sensor(s) to monitor a rearward line of sight or in opposite directions to determine whether a potential rearview obstruction exists. Of course the disclosure may find use in related environments and applications that encounter similar problems.

Vehicles with a fully loaded cargo area may affect the visibility of a driver to view directly out a rear window for other traffic. Likewise, vehicle occupants sitting in rear seats may potentially obstruct the view of the driver out the rear of the vehicle. In both instances, the line of sight or function of a rearview mirror is potentially compromised.

A need exists for an improved manner of monitoring directly behind a vehicle to assist the vehicle driver with complete awareness rearwardly of the vehicle.

SUMMARY

A monitoring system improves the ability to determine whether a potential obstruction exists that impacts a rearward view behind a vehicle.

The monitoring system includes a sensor to monitor a rearward line of sight (e.g., light curtain type sensor), and in another embodiment uses a forward detecting first sensor and a rearward detecting second sensor. A processor receives signals from the first and second sensors, and compares the signals to determine whether there is a potential rearward view obstruction via the rearview mirror. In response to a signal from the processor suggesting a potential rearward obstruction, a camera is activated to display a rearward view of the vehicle.

The system further includes a monitor to receive a live video image from the camera.

The first sensor is located on a first face of a rear view mirror.

The second sensor is located on a second face of the rear view mirror opposite the first face.

The processor includes an input that operatively communicates with headlights of the vehicle.

The image display may be formed as at least a portion of the rearview mirror, and may include the entire rearview mirror surface.

The image display may include at least a portion of the navigation screen.

The rearview camera is pivotally mounted on the vehicle to adopt a first position when the rearward view is potentially obstructed, and a different, second position when the vehicle is put in reverse gear.

A method of assisting a vehicle driver with monitoring a rearward view includes sensing the rearward line of sight of the driver. In one instance a light curtain sensor array is used while in another arrangement, the system senses ambient light forward of a vehicle interior, senses ambient light rearward from a vehicle interior, compares the sensed forward ambient light to the sensed rearward ambient light, and displays an image from a rearview camera if the sensed rearward ambient light is less than the sensed forward ambient light.

The displaying step includes displaying an image on at least a portion of the rearview mirror, or alternatively on an entire surface of the rear view mirror.

In another arrangement, the displaying step includes displaying an image on at least a portion of a navigation display monitor.

The method includes determining if headlights of the vehicle are on or off.

The method of sensing forward and rearward ambient light can be sensed from opposite front and rear faces of a rearview mirror.

The method may include pivoting the camera toward a different rearward view when the rearward view of the driver is obstructed, than when the vehicle is placed in reverse gear.

The system and method improve the ability to monitor potential obstructions in line of sight of the vehicle driver rearward of the vehicle.

The system and method can be easily incorporated into existing components of the vehicle.

Still another benefit relates to the improved safety and limiting the potential for damage to the vehicle.

Still other benefits and advantages of the present disclosure will become more apparent from reading and understanding the following detailed description.

Figure 12:
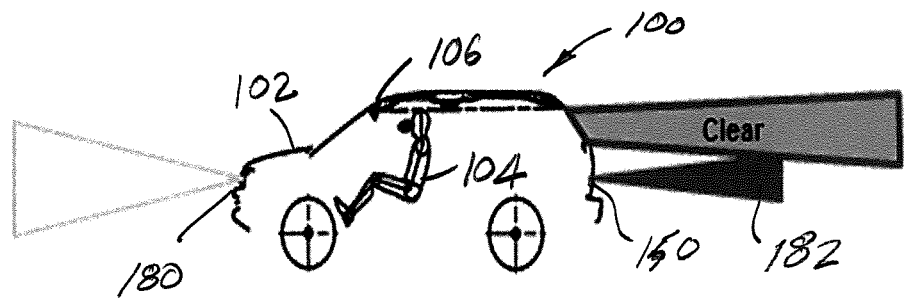
FIG. 12 is representative of a vehicle traveling at nighttime with the headlights on and traffic headlight or rear brake light entering the rear of the vehicle.
Figure 13:
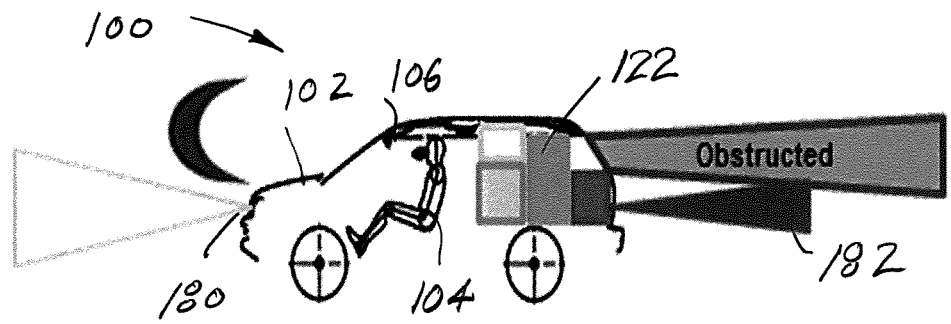

The FIG. 13 is a schematic representation similar to FIG. 12 where the sensors detect an at least partially obstructed rear view.

Figure 14:
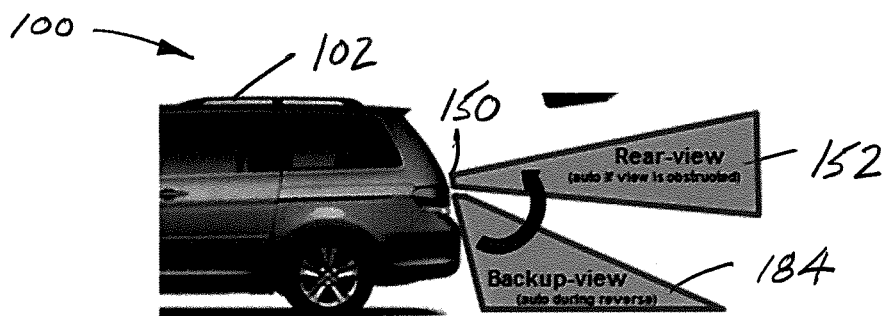

FIG. 14 illustrates alternative positioning of a rearview camera depending on whether an obstruction is detected or if the vehicle is placed in reverse.

DETAILED DESCRIPTION

Turning to FIGS. 1-11, a system 100 is provided that detects an at least partial rearview obstruction of a vehicle 102 and provides an alternative rear view (live image) for a vehicle driver in a display.

Figure 1:
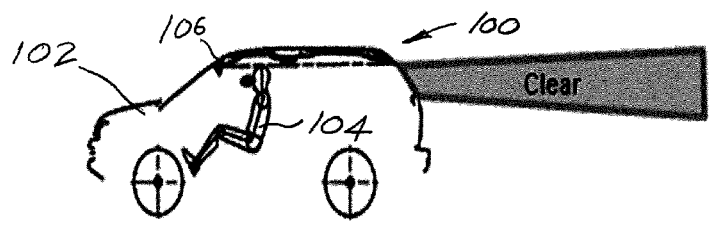
FIG. 1 is a schematic representation of a vehicle with a clear rearward view.

Referring to FIG. 1, a driver 104 of vehicle 102 is shown as having a "clear" line of sight in a rearward direction and in a region behind the vehicle. The line of sight is associated with use of a rearview mirror 106 in an interior compartment of vehicle 102. In addition to side mirrors 108, rearview mirror 106 assists driver 104 in evaluating the surroundings rearward of vehicle 102.

Figure 2:
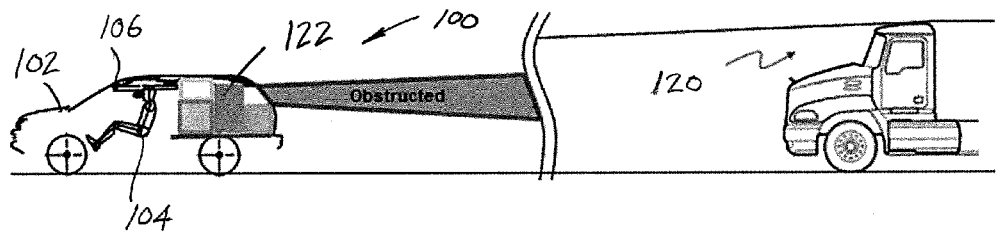
FIG. 2 is a schematic representation of a vehicle with a potentially obstructed rearward view.
Figure 3:
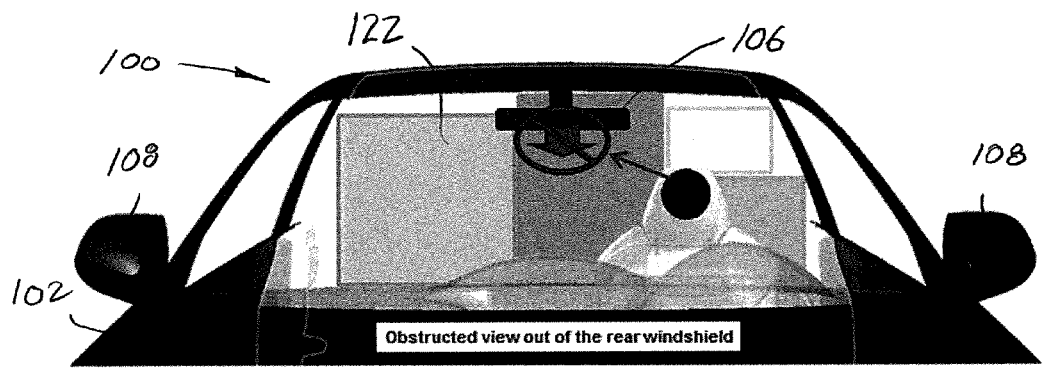
FIG. 3 is a schematic representation of the obstructed rearward view of FIG. 2 out the rear window.
Figure 4:
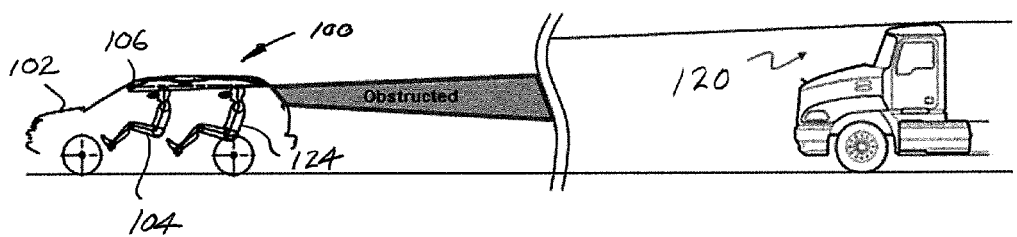
FIG. 4 schematic representation of a vehicle with another type of potentially obstructed rearward view.
Figure 5:
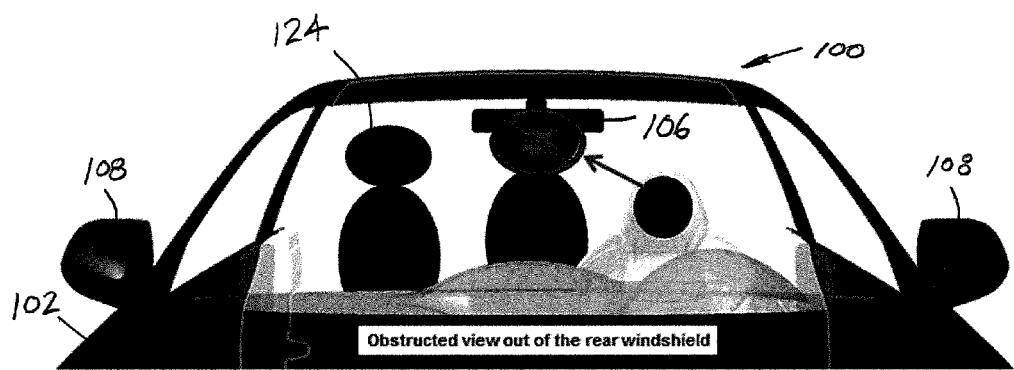
FIG. 5 is a schematic representation of the obstructed rearward view of FIG. 4 out the rear window.

Referring to FIGS. 2 and 4, another trailing vehicle 120 may be situated behind vehicle 102. With an unobstructed rearward view, trailing vehicle 120 is easily seen by the driver 104. However, if the rearward view is at least partially obstructed by cargo 122 (FIGS. 2-3), rear passengers 124 (FIGS. 4-5), a combination thereof, or other items or objects that impact the rearward view, system 100 detects a potential, at least partial rearview obstruction and activates an image on a display of the rearward view to assist driver 104. In each illustrated instance, at least a portion of the rearward view of vehicle driver 104 is fully or at least partially obstructed (shown here as being obstructed if the driver tries to use the rearview mirror 106 inside the vehicle compartment to view out the rear windshield).

Figure 6:
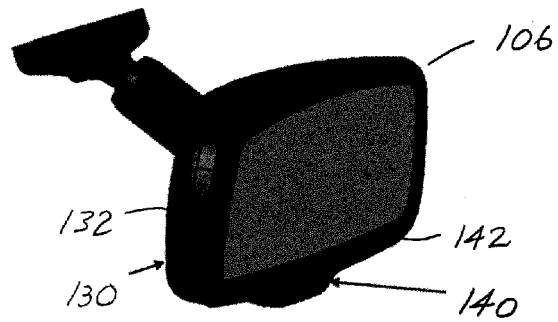
FIG. 6 is a mirror that employs first and second sensors directed in opposite directions.

To address the at least partially obstructed view, system 100 provides a sensor assembly that monitors in front of and behind vehicle 102. For example, a first sensor 130 is disposed in the vehicle compartment, and in a first embodiment the first sensor is located on a first or forward face 132 of rearview mirror 106 (FIG. 6). First sensor 130 is capable of detecting ambient light in a forward direction, i.e. through the front windshield of vehicle 102. In addition, a second sensor 140 is disposed in the vehicle compartment, and in the first embodiment the second sensor is located on a second or rearward face 142 of rearview mirror 106. Second sensor 140 is capable of detecting light conditions coming from behind vehicle 102. For example, the electrochromic mirror monitors in front of vehicle 102 through the front windshield via first sensor 130, and monitors behind the vehicle with second sensor 140 directed toward the rear window. The differences in the light conditions sensed by first and second sensors 130, 140 are typically used to control dimming of electrochromic mirror 106. Here, the same difference in light conditions is used to indicate potential obstruction in the rearward view of the driver's line of sight out the rear window. If the rearward view is partially or fully obstructed, a low light condition will be detected by the second sensor 140. One skilled in the art will recognize that the first and second sensors could be located at different locations in the vehicle compartment to achieve the same sensing function.

In an alternative arrangement, the mirror includes a sensor that includes a transmitter directed rearwardly from a location in a front portion of the vehicle 102, such as the rearview mirror, to a receiver positioned in a rear portion of vehicle. An array of parallel infrared light beams emitted from the transmitter is directed toward photoelectric cell(s) that comprise the receiver in the rear portion of the vehicle. If cargo and/or a rear passenger interrupts one or more of this array of light beams, a signal is sent indicating at least partial obstruction in the rearward line of sight view of the driver.

Figure 7:
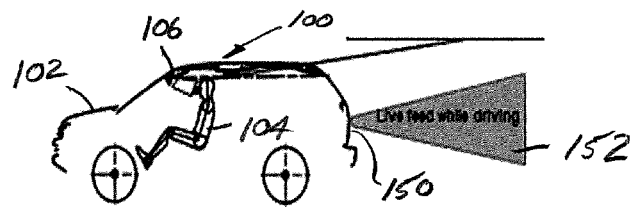
FIG. 7 schematically represents display of a live feed from a rearview camera on a rearview mirror if a rearward view obstruction is detected.
Figure 8:
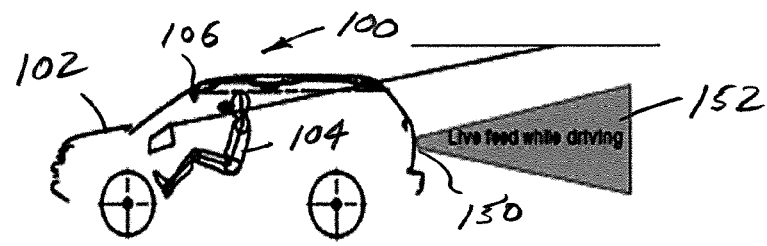
FIG. 8 schematically represents display of a live feed from a rearview camera on a navigation screen if a rearward view obstruction is detected.
Figure 9:
FIG. 9 illustrates display of the live feed from the rearview camera on a portion of the rearview mirror.
Figure 10:
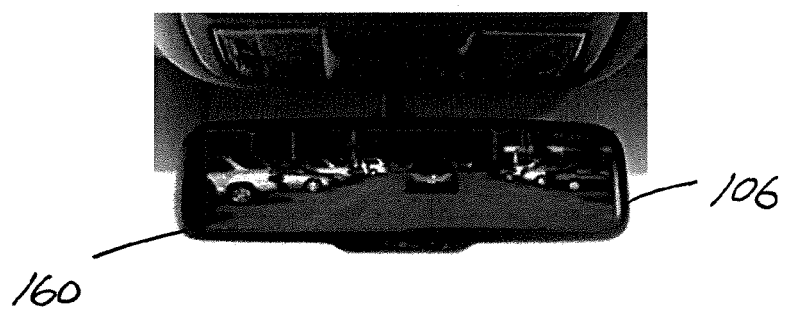
FIG. 10 illustrates a display of the live feed from the rearview camera on substantially the entirety of the rearview mirror.
Figure 11:
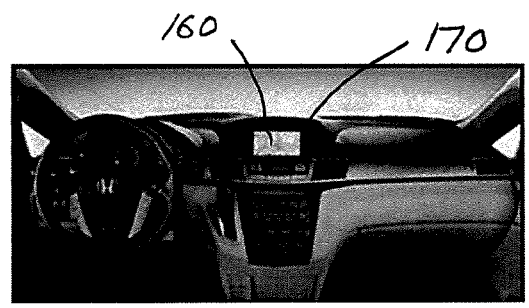
FIG. 11 illustrates display of the live feed on the navigation screen schematically shown in FIG. 8.

As a result of at least partial, potential rearward line of sight obstruction, a rearview camera 150 mounted on vehicle 102 is activated by a signal from the sensor assembly (or controller associated therewith). A region viewed by rearview camera 150 is identified by reference numeral 152 (FIGS. 7-8). In addition, a live image 160 of region 152 provided by rearview camera 150 is conveniently displayed for vehicle driver 104. By way of an example, image 160 may be displayed on a portion of rearview mirror 106 (FIG. 9), may be displayed on all or substantially all of the rearview mirror 106 (FIG. 10), or may be displayed on some or all of navigation panel or similar internal display panel 170 (FIG. 11).

FIGS. 12 and 13 are illustrative of nighttime function of system 100. Particularly, headlights 180 are shown in an "on" condition. In addition, rear brake lights are shown to provide additional illumination 182 rearward of the vehicle. With rear obstruction camera system 100 operative, rearview obstruction camera 150 will be activated in a condition shown in FIG. 13 where there is at least a partial obstruction to the rearward view or rearward line of sight of vehicle driver 104. Thus, either the light curtain sensor is interrupted, or in the alternative sensor arrangement, first sensor 130 is still able to detect light forward of the vehicle, for example associated with headlamps 180, while second sensor 140 monitors light coming through the rear window associated with the headlamps of trailing vehicles (not shown), as well as brake lights, etc. Again, a comparison of relative illumination or light is made and by periodically refreshing (e.g. every 5 seconds), the sensors ensure proper use of rearview obstruction camera 150.

Shown in FIG. 14 is another embodiment where the view of rearview camera 150 can be altered. For example, rearview camera 150 can be rotated, pivoted or mounted for rotating movement to provide the desired rearward view if an at least partial obstruction is detected in the manner described above, for example, with respect to FIGS. 1-13. The same camera 150 may also be used to provide a backup view 184 rearwardly of vehicle 102. Backup view 184 is typically directed at a lower angle sight line so that the camera is pointed downwardly and rearwardly. It is also appreciated that rearview camera 150 may have fish-eye viewing capability to accommodate these different lines of sight for different purposes.

Vehicles with a loaded cargo area could affect rearward visibility of the vehicle driver directly out the rear windshield when monitoring other traffic. Likewise, an occupant(s) sitting in the rear seats can obstruct the view of the driver out the rear of the vehicle. In both instances, rearview mirror function is potentially compromised. By using sensors, such as rearview mirror and attached sensors, the rearview obstruction camera system can detect if the line of sight of the driver out the rear of the vehicle is obstructed. If so, the rearview camera captures a live feed of traffic behind a vehicle and the image is displayed in front of the driver (e.g. on the rearview mirror or navigation display, or the like). The rearview mirror is equipped with electrochromic sensors, for example, to detect if rearward visibility is compromised. If potentially compromised, a live feed from the rearward camera is then projected to a convenient display location in front of the driver.

It is also contemplated that the image can be displayed on a portion of the display area or substantially all of the display area. Still another modification is that the rearview camera can serve to provide the automated rearward view if an obstruction is detected, and the same camera used to provide a backup view such as when a vehicle is placed in reverse gear. It is also contemplated that a light curtain sensor could be used to detect a rear line of sight. For example, a sensor includes a transmitter and a receiver where the transmitter projects an array of parallel, infrared light beams, for example, to the receiver which includes a number of photoelectric cells. If an object, rear passenger, or the like interrupts or breaks one or more of the beams, a signal is sent to the rearview camera in order to actuate a live image for display in front of the vehicle driver.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

It is claimed:

1. A system for monitoring potential obstruction of rearview mirror and implementing a rearview camera in a vehicle, the system comprising:
   a sensor assembly comprising a first sensor located on a first face of the rearview mirror to detect ambient light forward, a second sensor located on a second face of the rearview mirror opposite the first face to detect ambient light rearward; and
   a processor configured to:
      receive and compare signals obtained from the first and second sensors to determine whether there is a potential rearward view obstruction, and
      activate the rearview camera for displaying a rearward view of the vehicle in response to detecting that the ambient light rearward is less than the ambient light forward.

2. The system of claim 1, wherein the sensor assembly is integrated in a rearview mirror assembly.

3. The system of claim 1, further comprising a monitor receiving a video image from the rearview camera.

4. The system of claim 1, wherein the processor further includes an input in operative communication with headlights of the associated vehicle.

5. The system of claim 1, further comprising a display for displaying an image from the rearview camera.

6. The system of claim 5, wherein the display includes at least a portion of the rearview mirror.

7. The system of claim 5, wherein the display includes at least a portion of a navigation screen.

8. The system of claim 1, wherein the processor compares the signals from the first and second sensors periodically.

9. The system of claim 1, wherein the rearview camera is pivotally mounted and adopts a first position when the rearward view is not potentially obstructed and a different, second position when the rearward view is potentially obstructed.

10. The system of claim 1, wherein the rearview camera is directed toward a first rearward view in case of a detected rearview obstruction, and the rearview camera is directed toward a different, second rearward view when the vehicle is positioned in reverse gear.

11. A method of assisting an associated vehicle driver with monitoring a rearward view, the method comprising:
   sensing a rearward line of sight of a vehicle driver by at least detecting ambient light forward via a first sensor located on a first face of a rearview mirror of a vehicle and detecting ambient light rearward via a second sensor located on a second face of the rearview mirror opposite the first face; and
   displaying an image from a rearview camera in response to detecting at least a partial obstruction based at least upon detecting that the ambient light rearward is less than the ambient light forward.

12. The method of claim 11, wherein the displaying step includes displaying an image from the rearview camera on at least a portion of the rearview mirror.

13. The method of claim 11, wherein the displaying step includes displaying an image from the rearview camera on at least a portion of a navigation display monitor.

14. The method of claim 11, further comprising determining if headlights of the vehicle are on or off.

15. The method of claim 11, further comprising pivoting the camera toward a different rearward view when the rearward view of the driver is obstructed, or directing the camera toward a different rearward view when the vehicle is in reverse gear.

* * * * *